United States Patent
Gunji et al.

(10) Patent No.: US 6,762,251 B2
(45) Date of Patent: Jul. 13, 2004

(54) THERMOPLASTIC POLYHYDROXYPOLYETHER RESIN AND AN INSULATION FILM PRODUCED THEREFROM

(75) Inventors: Masao Gunji, Tokyo (JP); Chiaki Asano, Tokyo (JP); Hiroshi Sato, Tokyo (JP)

(73) Assignee: Tohto Kasei Co., Ltd., Tokyo (JP)

( * ) Notice: Subject to any disclaimer, the term of this patent is extended or adjusted under 35 U.S.C. 154(b) by 0 days.

(21) Appl. No.: 10/233,608

(22) Filed: Sep. 4, 2002

(65) Prior Publication Data

US 2004/0044146 A1 Mar. 4, 2004

(51) Int. Cl.$^7$ .............................................. C08G 59/03
(52) U.S. Cl. .................... 525/523 C; 525/930; 528/89; 528/99; 528/104
(58) Field of Search .............................. 525/523, 930; 528/89, 99, 104

(56) References Cited

FOREIGN PATENT DOCUMENTS

JP          2001-310939     * 11/2001

OTHER PUBLICATIONS

Derwent Abstract of JP'939.*

* cited by examiner

*Primary Examiner*—Robert Dawson
*Assistant Examiner*—D. Aylward
(74) *Attorney, Agent, or Firm*—Sherman & Shalloway

(57) ABSTRACT

The present invention is a thermoplastic polyhydroxypolyether resin having flame retardancy by itself represented by general formula (1), wherein phosphorus content is from 1% to 6% by weight, and weight-average molecular weight is from 10,000 to 200,000, (1)

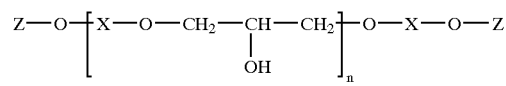

and an insulation film produced therefrom.

2 Claims, 1 Drawing Sheet

THERMOPLASTIC POLYHYDROXYPOLYETHER RESIN AND AN INSULATION FILM PRODUCED THEREFROM

BACKGROUND OF THE INVENTION

1. Field of the Invention

The present invention relates to a thermoplastic polyhydroxy polyether which has flame retardancy by containing phosphorus, which is useful in the electric field or electronic field such as a laminated board for electric equipment, a magnetic tape binder, an insulating varnish, and a self welding enamel electrical-wire varnish, adhesive field, an insulating coating or film field, further relates to an insulating film produced from said resin.

2. Description of the Prior Art

The thermoplastic polyhydroxypolyether resin is conventionally known as a phenoxy resin. Because of the excellent flexibility, shock resistance, adhesion and mechanical property which thermoplastic polyhydroxypolyether resin has, said resin is broadly used in the electric or electronic fields for example, a magnetic tape binder, an insulating varnish for electric equipment e.g. electric motor, adhesive for the circuit boards and a film. Especially, in the field in which the safety, e.g. prevention of fire and retardation of a flame is strongly required, the halogenated phenoxy resin was used, especially brominated phenoxy resin was mainly used. However, when the material which used the halogenide is used for long period of time at an elevated temperature, it is known that it will cause the maceration of a halogenide and this will cause the corrosion of a wiring. Further, in the case when the scraps of used electronic parts or electric equipment is burned, toxic substances such as halogen or halogenide are generated. And from the environmental safety view point, the direct or indirect use of hologen is becoming a problem, and the research to investigate the material to provide flame retardancy in stead of halogen are becoming to be carried out. The flame retardant film which uses thermoplastic polyhydroxy polyether resin is disclosed in JP 5-93041A or in JP 5-93042 A publication. Almost all of flame retardancy agents used in these documents are a halogenide, and the flame retardancy by use of phosphorus is not described. As a flame retardant compound which uses phosphorus compounds, a compound described in "Synthesis and properties of epoxy resins containing 2-(6-oxid-6H-dibenz <c,e><1,2>oxaphosphorin-6-yl) 1,4-benzenediol" by WANG C-S, SHIEH J-Y, Polymer (GBR) VOL.39, NO.23, PAGE 5819–5826 (1998) can be mentioned. However, this compound is using the compound obtained by addition reaction of the phosphorus containing compound with benzoquinone as a reactive flame retardant compound for epoxy resin, which is thermosetting resin. In "Novel flame retardant epoxy resins. I. Synt-hesisi, characterization, and properties of arylphosphinate epoxy ether cured with diamine." by CHO C-S, CHEN L-W, CHIU Y-S, Polymer Bulletin VOL.41, NO.1, PAGE 45–52 (1998), a new epoxy resin is disclosed as a thermosetting resin obtained from a phosphorus containing compound, a benzoquinone and epichlorohydrin. However, in these documents, there is no indication about thermoplastic resin and the insulating film.

BRIEF SUMMARY OF THE INVENTION

The object of the present invention is to provide a thermoplastic polyhydroxy polyether resin which has flame retardant property without using a halogenide and to provide an insulating film formed by using said resin.

BRIEF ILLUSTRATION OF THE DRAWING

DETAILED DISCRIPTION OF THE INVENTION

Figure 1:
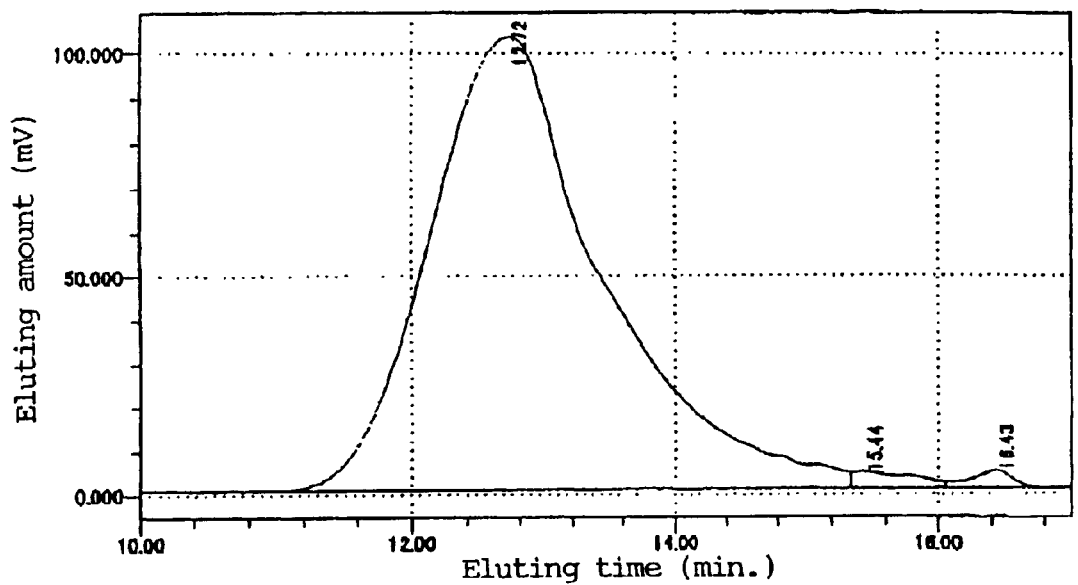
FIG. 1 is the GPC chart of the thermoplastic polyhydroxypolyether resin obtained in Example 1.
Figure 2:
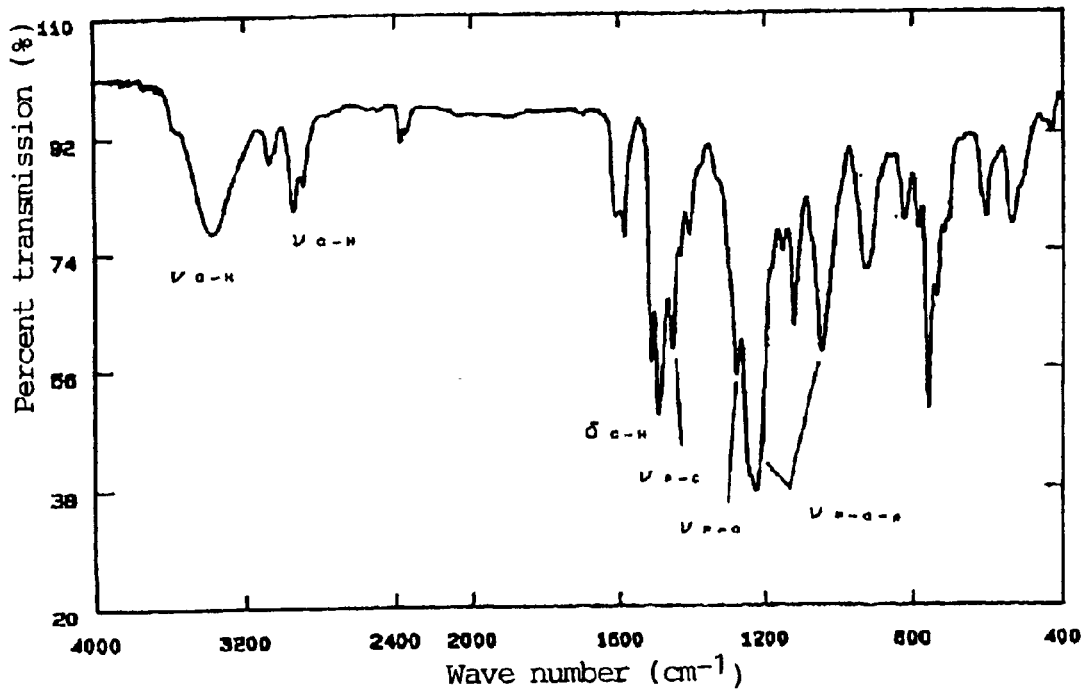
FIG. 2 is the IR spectrum chart of the thermoplastic polyhydroxy polyether resin obtained in Example 1.

The present invention is to obtain a thermoplastic polyhydroxy polyether resin of molecular weight 10,000 to 200,000 [weight average molecular weight indicated by standard polyethylene-oxide conversion, measured by a gel permeation chromatography (GPC) using Shodex AD-800P+TSKgel SuperHM-H+SuperHM-H+SuperH2000 as a column, using N.N-dimethylformamide (containing 20 mM lithium-bromide) as an eluting solution and under the condition of 0.5% specimen concentration] represented by general formula (1) containing compounds represented by general formula (2) and/or general formula (3) as the necessary components, by adjusting phosphorus contents to be 1 wt. % to 6 wt. %. Said thermoplastic polyhydroxypolyether resin has a flame retardancy property by itself and does not contain halogen which provide flame retardancy.

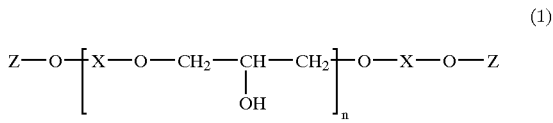

(1)

In the formula, X is one selected from the group consisting of general formulae (2), (3), (6) and (7), and general formula (2) and/or general formula (3) is a compound alone of a necessary component or a combination of them, Z is a hydrogen atom or a compound of general formula (9) and n is a numerical value bigger than 21.

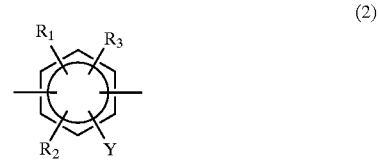

(2)

In the formula, Y is one selected from the group consisting of general formulae (4) and (5) and $R_1$–$R_3$ is a hydrogen atom, an alkyl group of carbon number 1–4 or a phenyl group, further, more than two of $R_1$–$R_3$ can be same.

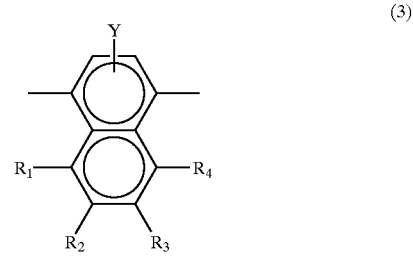

(3)

In the formula, Y is one selected from the group consisting of general formulae (4) and (5) and $R_1$–$R_4$ is a hydrogen atom, an alkyl group of carbon number 1–4 or a phenyl group, further, more than two of $R_1$–$R_4$ can be same.

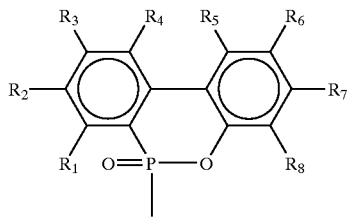

(4)

In the formula, $R_1$–$R_8$ is a hydrogen atom, an alkyl group of carbon number 1–4 or a phenyl group, further, more than two of $R_1$–$R_8$ can be same.

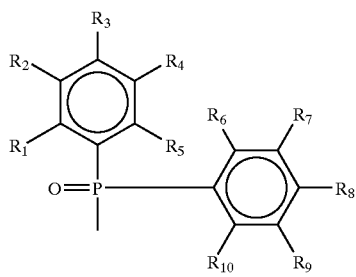

(5)

In the formula, $R_1$–$R_{10}$ is a hydrogen atom, an alkyl group of carbon number 1–4 or a phenyl group, further, more than two of $R_1$–$R_{10}$ can be same.

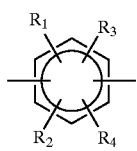

(6)

In the formula, $R_1$–$R_4$ is a hydrogen atom, an alkyl group of carbon number 1–4 or a phenyl group, further, more than two of $R_1$–$R_4$ can be same.

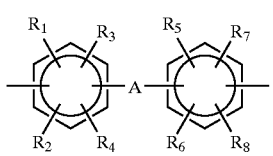

(7)

In the formula, A is one selected from the divalent group consisting of —, —$CH_2$—, —$C(CH_3)_2$—, —$CHCH_3$—, —S—, —$SO_2$—, —O—, —CO— and a general formula (8), (remarks: — is the case that phenyl group is bonded directly) and $R_1$–$R_8$ is a hydrogen atom, an alkyl group of carbon number 1–4 or a phenyl group, further, more than two of $R_1$–$R_8$ can be same.

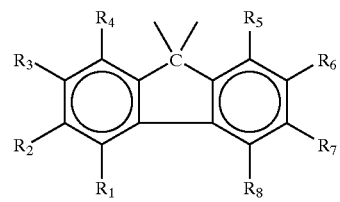

(8)

In the formula, $R_1$–$R_8$ is a hydrogen atom, an alkyl group of carbon number 1–4 or a phenyl group, further, more than two of $R_1$–$R_8$ can be same.

$$-CH_2-CH-CH_2 \atop \underset{O}{\diagdown\diagup}$$ (9)

The polyhydroxypolyether resin containing phosphorus atom of the present invention comprising, dihydric phenols represented by general formula (10) and/or general formula (11) as necessary components can be prepared by reacting [A] with [B] under the presence of well-known catalyst such as amine, imidazole, triphenylphosphonium or phosphonium-salt using one or more sorts of inactive solvent, for example, toluene, xylene, methyl ethyl ketone, methyl isobutyl ketone, dioxane, isopropyl alcohol, butyl alcohol, methylcellosolve, ethylcellosolve and cyclohexanone in the case when the need is arisen by the amount which provides phenolichydroxy:epoxy molar ratio of 0.9:1 to 1.1:1, desirably 0.94:1 to 1.06:1 and most desirably 0.97:1 to 1.03:1, so as the phosphorus contents in polyhydroxypolyether resin to be from 1 wt. % to 6 wt. %, wherein,

[A] is one or the mixture of other sort of dihydric phenol, and as an example, hydroquinone, 2,5-di-t-butylhydroquinone, bisphenol A, bisphenol F, 4,4'-bishydroxybiphenyl, 9,9'-bis(4-hydroxyphenyl)fluorene and 1,4-naphthalene diol can be mentioned, however, not intending to be limited to them,

[B] is one or the mixture of diglycidylether of dihydric phenol, and as an example, bisphenol A diglycidylether, bisphenol F diglycidylether, bisphenol S diglycidylether, hydroquinone diglycidylether, 2,5-di-t-butyl hydroquinone diglycidylether, 4,4'-bishydroxy biphenyl diglycidylether, and 1,4-naphthalenediol diglycidylether, 9,9'-bis(4-hydroxyphenyl) fluorene diglycidylether can be mentioned, however, not intending to be limited to them.

The desirable reactive temperature is from 60° C. to 200° C., and especially desirable reactive temperature is from 90° C. to 180° C. The reactive pressure is usually an ordinary pressure. Elimination of reaction heat is performed by a flash vaporization, an indirect cooling methods or the together use of these methods.

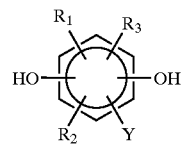

(10)

In the formula Y is one selected from general formula (4) or general formula (5), and $R_1$–$R_3$ is a hydrogen atom, an alkyl group of carbon number 1–4 or phenyl group, further, more than two of $R_1$–$R_3$ can be same.

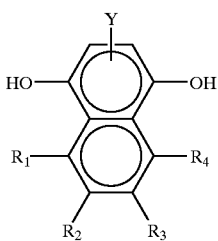

(11)

In the formula Y is one selected from general formula (4) or general formula (5), and $R_1$–$R_4$ is a hydrogen atom, an alkyl group of carbon number 1–4 or a phenyl group, further, more than two of $R_1$–$R_4$ can be same.

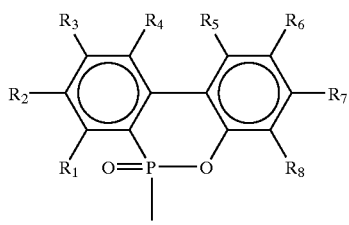

(4)

In the formula, $R_1$–$R_8$ is a hydrogen atom, an alkyl group of carbon number 1–4 or a phenyl group, further, more than two of $R_1$–$R_8$ can be same.

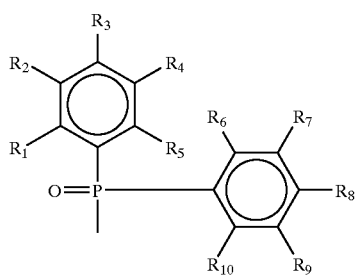

(5)

In the formula, $R_1$–$R_{10}$ is a hydrogen atom, an alkyl group of carbon number 1–4 or a phenyl group, further, more than two of $R_1$–$R_{10}$ can be same.

Among the compounds represented by general formula (10), as an example which characterizing that Y is a compound corresponded to general formula (4), 10-(2,5-dihydroxyphenyl)-10H-9-oxa-10-phenanthrene-10-oxide can be mentioned, and as an example which characterizing that Y is a compound corresponded to general formula (5), diphenylphosphonylhydroquinone can be mentioned, however, not intending to be limited to them.

Among the compounds represented by general formula (11), as an example which characterizing that Y is a compound corresponded to general formula (4), the reacted product of 1,4-naphthoquinone with 9,10-dihydro-9-oxa-10-phenanthrene-10-oxide can be mentioned, and as an example of Y is a compound corresponded to general formula (5), diphenylphosphonylnaphthohydroquinone can be mentioned, however, not intending to be limited to them.

In the thermoplastic polyhydroxypolyether resin, in the case when the molecular weight is smaller than 10,000, the thermoplasticity is lost, and in the case when the molecular weight exceeds 200,000, the viscosity of resin solution from 70 wt % to 30 wt % concentration, which is the ordinary concentration in the industrial application, is too high and lacks of convenience. In order to make it usable viscosity, it is necessary to add a lot of solvents and to lower resin concentration, and it can not be avoided that the process economical efficiency gets worse. Further, from the environmental view point, the thermoplastic polyhydroxypolyether resin whose molecular weight is out of above mentioned upper limit is not so good, because currently the reduction of VOC (volatile organic compound) is strongly required. Concerning above mentioned circumstances, the molecular weight is from 10,000 to 200,000, desirably is from 15,000 to 150,000 and more desirably from 20,000 to 120,000.

Next, the applicable concentration range of phosphorus contained in thermoplastic polyhydroxypolyether resin is referred. When the phosphorus content is smaller than 1 wt. %, it is difficult to provide sufficient flame retardancy. Accordingly, the flame retardancy can be provided at any concentration over than 1 wt. %, however, when the phosphorus concentration exceeds 6 wt. %, the flame retardancy enhancement due to the increase of the concentration can not be expected. Moreover, at the concentration larger than 6 wt. %, the solvent solubility of the resin becomes bad, and the resin becomes not to be dissolved except by the specific solvent. Therefore, it is practical to adjust the phosphorus concentration to the range from 1 wt. % to 6 wt. %, more desirably to the range from 1.5 wt. % to 5.5 wt. %.

The thermoplastic polyhydroxypolyether resin which is synthesized as above, is the compound which has flame retardancy and flexibility by itself and can be used alone, or can contain epoxy resin, melamine resin, isocyanate resin or phenol resin. Moreover, for the purpose to improve heat resistance and flame retardancy and to reduce the coefficiency of linear expansion, silica, calcium carbonate, talc, aluminum hydroxide, alumina or mica, further for the purpose to improve the adhesive power, an epoxy silane coupling agent and rubber component can be added in the limit not to deteriorate the physical property of the thermoplastic polyhydroxy polyether resin.

EXAMPLE

The present invention will be illustrated more readily in accordance with the following Examples and Comparative Examples, however, not intending to be limited to them. In these Examples and Comparative Examples, "part" indicates "weight parts".

Example 1

162 parts of phosphorus containing phenol HCA-HQ [product of Sanko Chemical Co., Ltd. Osaka Japan, 10-(2, 5-dihydroxyphenyl)-10H-9-oxa-10-phenanthrene-10-oxide whose hydroxyl-equivalent is 162 gr/eq and phosphorus contents is 9.5%], 175 parts of difunctional epoxy resin, YD8125 (product of Tohto Kasei Co., Ltd. Tokyo Japan, whose epoxy equivalent is 171.6 gr/eq), 144 parts of cyclohexanone and 0.13 parts of 2ethyl4methylimidazole (product of Shikoku Kasei Co., Ltd. Tokyo Japan, hereinafter shortened to 2E4MZ) as a catalyst are put into a separable flask made of glass with four openings equipped with a stirrer, a thermometer, a cooling tube and a nitrogen gas introduction equipment. After reacted at ordinary-pressure and the temperature of 150° C. to 170° C. for 15 hours, 156 parts of cyclohexanone and 300 parts of N,N-dimethylformamide are added, 937 parts of cyclohexanone.N,N-dimethylformamide mixed varnish of polyhydroxy polyether resin whose epoxy-equivalent is 17,200 gr/eq, phosphorus content is 4.6%, content of solid part is 36% (hereinafter shortened to N.V.), solution viscosity is 5,900 mPa·s/25° C. and weight average molecular weight is 62,000 is obtained. This resin is named synthetic resin varnish I. This synthetic resin varnish I is applied on a releasing film (PET) with a roller coater so that the resin thickness after solvent vaporized to be 60 µm, then dried up to vaporize solvent for 5 to 15 minutes at the temperature of 140° C. to 160° C., thus an insulation film is obtained. Moreover, a test piece for copper foil peel strength measurement is prepared by laminating said insulating film and copper foil of 35 µm thickness on a standard test panel (PM-3118M, product of a Japanese Test Panel Industry) using a dry laminator at the temperature of 160° C. Furthermore, to a specimen of CCL-HL830 (product of Mitsubishi Gas Chemical, UL-94V-0) from which a copper foil of 0.8 mm thickness is removed, an insulating film with releasing film is piled and laminated at the temperature of 160° C. and a test piece for inflammable measurement is obtained.

The measuring methods are illustrated as follows.

Copper-foil peeling strength: Measured by an autograph under the ambient atmosphere of 25° C.

Glass transition temperature: An insulating film without carrying out lamination process is measured by a TMA.

Water-absorption: The water absorption at 100% humidity, 85° C. and 100 hrs is measured. An insulating film without carrying out lamination process is used as the a piece.

Flammability: A test piece for inflammable measurement is evaluated according to UL-94V testing method.

The obtained results of the insulation film are summarized as follows. Glass transition temperature is 140° C., water-absorption is 1.8%, copper-foil peeling strength is 1.7 kgf/cm and flammability test (UL-94) is V-0.

Example 2

126 parts of phosphorus containing phenol HCA-HQ (same as to Example 1), 52 parts of bisphenol A (epoxy equivalent is 114 gr/eq), 218 parts difunctional epoxy resin YD-8125 (same as to Example 1), 171 parts of cyclohexanon and 0.16 parts of 2E4MZ as a catalyst are put into a separable flask made of glass with four openings equipped with a stirrer, a thermometer, a cooling tube and a nitrogen gas introduction equipment. After reacted at ordinary-pressure and the temperature of 150° C. to 170° C. for 18 hours, 225 parts of cyclohexanone and 198 parts of methylethyl ketone is added, then 990 parts of cyclohexanone-methylethyl ketone mixed varnish of polyhydroxypolyether resin whose epoxy-equivalent is 13,300 gr/eq, phosphorus content is 3.0%, N.V. is 40%, solution viscosity is 5,200 mPa·s/25° C. and weight average molecular weight is 38,000 is obtained. This resin is named synthetic resin varnish II. By same method to Example 1 except using synthetic resin varnish II, an insulation film, a test piece for copper foil peel strength measurement and a test piece for inflammable measurement are obtained.

The obtained results of the insulation film are summarized as follows. Glass transition temperature is 128° C., water-absorption is 1.4%, copper-foil peeling strength is 1.6 kgf/cm and inflammable test (UL-94) is V-0.

Example 3

187 parts of phosphorus containing phenol HCA-NQ (reacted product of 9,10-dihydro-9-oxa-10-phosphaphenanthrene-10-oxide with 1,4-naphtho quinone; hydroxyl-equivalent is 187 gr/eq, and phosphorus content is 8.2%), 40 parts of difunctional epoxy resin YDF-8170 (product of Tohto Kasei Co., Ltd. Tokyo Japan; epoxy equivalent is 171.6 gr/eq), 130 parts of YDF-8125 (same as to Example 1), 153 parts of cyclohexanone and 0.14 parts of 2E4MZ as a catalyst are put into a separable flask made of glass with four openings equipped with a stirrer, a thermometer, a cooling tube and a nitrogen gas introduction equipment. After reacted at ordinary-pressure and the temperature of 150° C. to 170° C. for 20 hours, 165 parts of cyclohexanone and 318 parts of N,N-dimethylformamide is added, then 993 parts of cyclohexanone.N,N-dimethylformamide mixed varnish of polyhydroxypolyether resin whose epoxy-equivalent is 40,800 gr/eq, phosphorus content is 4.3%, N.V is 36%, solution viscosity is 8,900 mPa·s/25° C. and weight average molecular weight is 88,000 is obtained. This resin is named synthetic resin varnish III. By same method to Example 1 except using synthetic resin varnish III, an insulation film, a test piece for copper foil peel strength measurement and a test piece for inflammable measurement are obtained.

The obtained results of the insulation film are summarized as follows. Glass transition temperature is 151° C., water-absorption is 1.5%, copper-foil peeling strength is 1.8 kgf/cm and inflammable test (UL-94) is V-0.

Example 4

162 parts of phosphorus containing phenol HCA-HQ (same as to Example 1), 198 parts of difunctional epoxy resin YX-4000H (product of Yuka Shell Epoxy Co., Ltd. Tokyo Japan; epoxy equivalent is 194.1 gr/eq), 154 parts of cyclohexanone and 0.14 parts of 2E4MZ as a catalyst are put into a separable flask made of glass with four openings equipped with a stirrer, a thermometer, a cooling tube and a nitrogen gas introduction equipment. After reacted at ordinary-pressure and the temperature of 155° C. to 175° C. for 20 hours, 116 parts of cyclohexanone and 270 parts of N,N-dimethylformamide is added, then 900 parts of cyclohexanone N,N-dimethylformamide mixed varnish of polyhydroxypolyether resin whose epoxy-equivalent is 37,000 gr/eq, phosphorus content is 4.3%, N.V. is 40%, solution viscosity is 8,400 mPa·s/25° C. and weight average molecular weight is 58,000 is obtained. This resin is named synthetic resin varnish IV. By same method to Example 1 except using synthetic resin varnish IV, an insulation film, a test piece for copper foil peel strength measurement and a test piece for inflammable measurement are obtained.

The obtained results of the insulation film are summarized as follows. Glass transition temperature is 132° C., water-absorption is 1.3%, copper-foil peeling strength is 1.9 kgf/cm and inflammable test (UL-94) is V-0.

Example 5

62 parts of phosphorus containing phenol HCA-NQ (same as to Example 3), 115 parts of bisphenol fluorene (product of Nippon Steel Chemical Co., Ltd, Tokyo Japan; hydroxyl-equivalent is 175.2 gr/eq), 162 parts of difunctional epoxy resin YDF-8170 (same as to Example 3), 146 parts of cyclohexanone and 0.14 parts of 2E4MZ as a catalyst are put into a separable flask made of glass with four openings equipped with a stirrer, a thermometer, a cooling tube and a nitrogen gas introduction equipment. After reacted at ordinary-pressure and the temperature of 150° C. to 170° C. for 16 hours, 193 parts of cyclohexanone and 169 parts of methylethyl ketone is added, then 847 parts of cyclohexanone-methylethyl ketone mixed varnish of polyhydroxypolyether resin whose epoxy-equivalent is 12,500 gr/eq, phosphorus content is 1.5%, N.V. is 40%, solution viscosity is 7,800 mPa·s/25° C. and weight average molecular weight is 33,000 is obtained. This resin is named synthetic resin varnish V. By same method to Example 1 except using synthetic resin varnish V, an insulation film, a test piece for copper foil peel strength measurement and a test piece for inflammable measurement are obtained.

The obtained results of the insulation film are summarized as follows. Glass transition temperature is 149° C., water-absorption is 1.2%, copper-foil peeling strength is 1.3 kgf/cm and inflammable test (UL-94) is V-0.

Example 6

217 parts of diphenylphosphonylhydroquinone (hydroxyl equivalent is 155 gr/eq and phosphorus content is 1.0%), which is phosphrus containing phenol, 207 parts of difunctional epoxy resin YDF-8170 (same as to Example 3), 179 parts of cyclohexanone and 0.42 parts of triphenylphosphine (product of Hokkou Chemical Co., Ltd) as a catalyst are put into a separable flask made of glass with four openings equipped with a stirrer, a thermometer, a cooling tube and a nitrogen gas introduction equipment. After reacted at ordinary-pressure and the temperature of 150° C. to 170° C. for 8 hours, 33 parts of cyclohexanone and 212 parts of methylethyl ketone is added, then 848 parts of cyclohexanone methylethyl ketone mixed varnish of polyhydroxypolyether resin whose phenolic hydroxy equivalent is 4,400 gr/eq, phosphorus content is 5.1%, N.V. is 50%, solution viscosity is 4,900 mPa·s/25° C. and weight average molecular weight is 19,000 is obtained. This resin is named synthetic resin varnish VI. By same method to Example 1 except using synthetic resin varnish VI, an insulation film, a test piece for copper foil peel strength measurement and a test piece for inflammable measurement are obtained.

The obtained results of the insulation film are summarized as follows. Glass transition temperature is 112° C., water-absorption is 1.4%, copper-foil peeling strength is 1.1 kgf/cm and inflammable test (UL-94) is V-0.

Comparative Example 1

15 parts of phosphorus containing phenol HCA-HQ (same as to Example 1), 103 parts of bisphenol A (hydroxyl equivalent is 114 gr/eq), 163 parts of difunctional epoxy resin YDF-8170 (same as to Example 3), 120 parts of cyclohexanone and 0.11 parts of 2E4MZ as a catalyst are put into a separable flask made of glass with four openings equipped with a stirrer, a thermometer, a cooling tube and a nitrogen gas introduction equipment. After reacted at ordinary-pressure and the temperature of 150° C. to 170° C. for 15 hours, 91 parts of cyclohexanone and 211 parts of methylethyl ketone are added then 703 parts of cyclohexanone.methylethyl ketone mixed varnish of polyhydroxypolyether resin whose epoxy equivalent is 10,100 gr/eq, phosphorus content is 0.5%, N.V. is 40%, solution viscosity is 3,200 mPa·s/25° C. and weight average molecular weight is 33,000 is obtained. This resin is named synthetic resin varnish VII. By same method to Example 1 except using synthetic resin varnish VII, an insulation film, a test piece for copper foil peel strength measurement and a test piece for inflammable measurement are obtained.

The obtained results of the insulation film are summarized as follows. Glass transition temperature is 114° C., water-absorption is 2.1%, copper-foil peeling strength is 1.8 kgf/cm and inflammable test (UL-94) is V-1.

The properties of insulation films obtained in above mentioned Examples an Comparative Examples are summarized in Table 1. Although these phosphorus containing polyhydroxypolyether resin does not contain halogen, are all ranked to V-0 grade in the inflammable test (UL-94).

TABLE 1

|  | flame retardancy UL-94 | copper-foil peeling strength (kgf/cm) | glass transition temperature (° C.) | water-absorption (%) |
| --- | --- | --- | --- | --- |
| Example 1 | V-0 | 1.7 | 140 | 1.8 |
| Example 2 | V-0 | 1.6 | 128 | 1.4 |
| Example 3 | V-0 | 1.8 | 151 | 1.5 |
| Example 4 | V-0 | 1.9 | 132 | 1.3 |
| Example 5 | V-0 | 1.3 | 149 | 1.2 |
| Example 6 | V-0 | 1.1 | 112 | 1.4 |
| Comparative Example 1 | V-1 | 1.8 | 114 | 2.1 |

EFFECT OF THE INVENTION

When the thermoplastic polyhydroxypolyether resin of the present invention is used, the insulation film whose water absorption is relatively small, has adherence and has flame retardancy by itself without using a halogenide can be prepared. This invention is matching to the current requirement from the viewpoint of environmental safety that the use of a halogen and a halogenide is regarded as a serious problem. Therefore, the present invention is greatly valuable from the technical viewpoint.

What is claim:

1. A thermoplastic polyhydroxypolyether resin having flame retardancy by itself represented by general formula (1), wherein phosphorus content is from 1% to 6% by weight, and weight-average molecular weight is from 10,000 to 200,000,

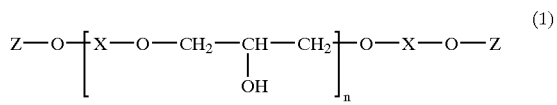

(1)

wherein, X is one selected from the group consisting of general formulae (2), (3), (6) and (7), and a general formula (2) and/or general formula (3) is a compound alone of a necessary component or a combination of them, Z is a hydrogen atom or a compound of general formula (9) and n is a numerical value bigger than 21,

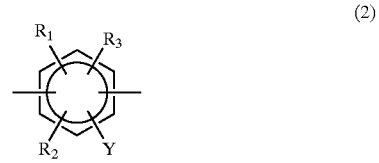

(2)

wherein, Y is one selected from the group consisting of general formulae (4) and (5) and $R_1$–$R_3$ is a hydrogen atom, an alkyl group of carbon number 1–4 or a phenyl group, further, more than two of $R_1$–$R_3$ can be same, (3)

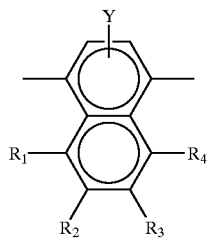

wherein, Y is one selected from the group consisting of general formulae (4) and (5) and $R_1$–$R_4$ is a hydrogen atom, an alkyl group of carbon number 1–4 or a phenyl group, further, more than two of $R_1$–$R_4$ can be same, (4)

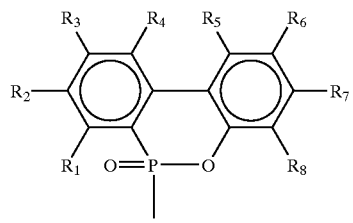

wherein, $R_1$–$R_8$ is a hydrogen atom, an alkyl group of carbon number 1–4 or a phenyl group, further, more than two of $R_1$–$R_8$ can be same, (5)

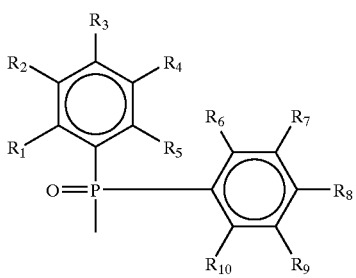

wherein, $R_1$–$R_{10}$ is a hydrogen atom, an alkyl group of carbon number 1–4 or a phenyl group, further, more than two of $R_1$–$R_{10}$ can be same, (6)

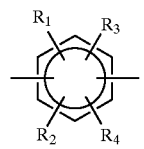

wherein, $R_1$–$R_4$ is a hydrogen atom, an alkyl group of carbon number 1–4 or a phenyl group, further, more than two of $R_1$–$R_4$ can be same, (7)

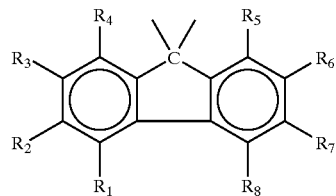

wherein, A is one selected from the divalent group consisting of —, —$CH_2$—, —$C(CH_3)_2$—, —$CHCH_3$—, —S—, —$SO_2$—, —O—, —CO— and a general formula (8), (remarks: — is the case that phenyl group is bonded directly) and $R_1$–$R_8$ is a hydrogen atom, an alkyl group of carbon number 1–4 or a phenyl group, further, more than two of $R_1$–$R_8$ can be same, (8)

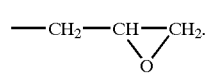

wherein, $R_1$–$R_8$ is a hydrogen atom, an alkyl group of carbon number 1–4 or a phenyl group, further, more than two of $R_1$–$R_8$ can be same, (9)

$$—CH_2—CH—CH_2.$$
$$\phantom{—CH_2—}\underset{O}{\diagdown\diagup}$$

2. An insulation film produced from the thermoplastic polyhydroxypolyether resin of claim 1.

* * * * *